Figure 2:
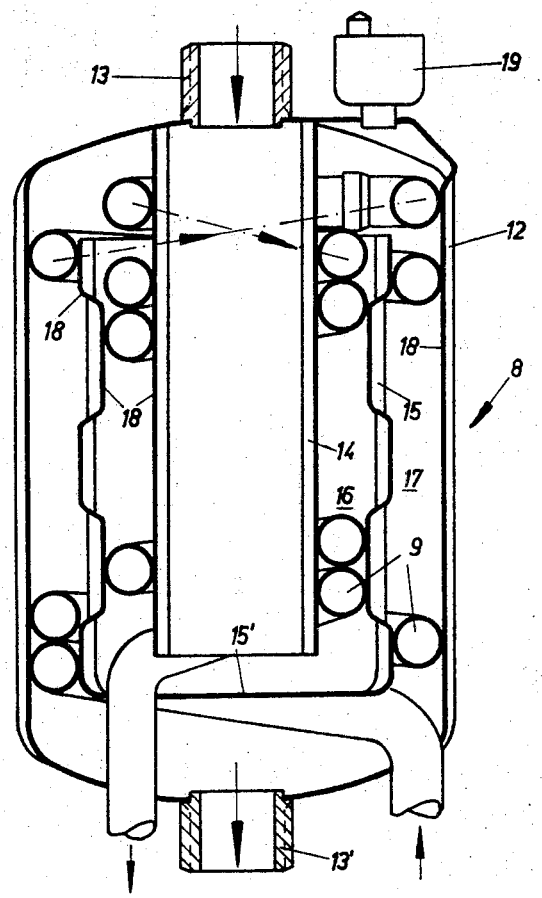

United States Patent

[11] 3,544,005

| [72] | Inventors | Hans Meier;<br>Max Albert Mueller, Remscheid, Germany |
|---|---|---|
| [21] | Appl. No. | 789,522 |
| [22] | Filed | Jan. 7, 1969 |
| [45] | Patented | Dec. 1, 1970 |
| [73] | Assignee | Joh. Vaillant KG.<br>Remscheid, Germany |
| [32] | Priority | Jan. 13, 1967 |
| [33] | | Germany |
| [31] | | No. 1,753,300 |

[54] HOT WATER CIRCULATION HEATING SYSTEM
3 Claims, 3 Drawing Figs.

[52] U.S. Cl. .................................................. 237/8,
                                                        237/19
[51] Int. Cl. ..................................................... F24d 3/02,
                                                        F24d 3/08
[50] Field of Search .......................................... 237/8, 19

[56] References Cited
UNITED STATES PATENTS

| 2,127,732 | 8/1938 | Heitman | 165/160 |
| 2,290,347 | 7/1942 | Moore et al. | 237/19 |
| 2,322,872 | 6/1943 | Moore | 237/8 |
| 3,426,971 | 2/1969 | Meier | 237/8 |

*Primary Examiner*—Edward J. Michael
*Attorney*—Darbo, Robertson & Vandenburgh

ABSTRACT: A hot water circulation heating system comprises a gas-heated instantaneous water heater used as a heat source, in which a domestic water heater is connected in a connection line leading from the supply line to the return flow line of the heating circuit connected to the water heater thereby short circuiting the heating circuit. A flow through the connection line is released by a thermostatically controlled priority switch valve both during the initial heating-up period and also during the drawing of domestic water. A domestic water heat exchanger is connected in said connection line. Annular spaces are provided in said container of said domestic water heat exchanger by concentric inserts for the flow of the circulating heating water therethrough from the connection line, so that flow is effected by multiple reversal of the direction of flow and reduction of the rate of flow.

Thereby the container is adapted as air separator and is provided with an automatic air exhaust valve.

Patented Dec. 1, 1970

3,544,005

INVENTORS:
Hans Meier and
Max Albert Müller

BY
Darbo, Robertson - Vandenburgh
Attys.

HOT WATER CIRCULATION HEATING SYSTEM

The present invention relates to a hot water circulation heating system comprising a gas-heated instantaneous water heater used as a heat source. In systems of the type indicated it is known to connect a domestic water heat exchanger in a connection line leading from the supply line to the return flow line by short circuiting the heating circuit. Furthermore, in a system of the type indicated it is known to incorporate an automatic air separator in the return flow line of the system by which the air separated from the circulating water particularly during the heating-up period is exhausted into the open air.

It has already been proposed to release a flow through the connection line by a thermostatically controlled priority switch valve both during the heating-up period and also during the draw of domestic water. According to this proposal, the connection line with the domestic water heat exhanger incorporated therein remains open as long as the temperature of the supply water has not yet reached a predetermined value. Also, the connection line to the heat exchanger is opened by the valve if, during normal heating operation, domestic water is drawn from the domestic water heat exchanger so that heating of the domestic water is given priority to the heating circulation. This proposed double function of the connection line short circuiting the heating circuit renders possible a substantial simplification of the system and is the prerequisite to the present invention the same residing in the fact that the container of the domestic water heat exchanger is adapted as air separator and is provided with an automatic air exhaust valve.

Since the circulating heating water not only flows the container of the domestic water heat exchanger during the draw of domestic water, but also during every heating-up period, said container may be adapted as air separator and a separate air separator provided in the return flow line can be avoided.

Expediently annular spaces are provided in the container of the domestic water heater by concentric inserts for the flow of the circulating heating water therethrough, so that flow is effected by multiple reversal of the direction of flow and reduction of the rate of flow. With such a design of the container the air entrapped in the circulating heater water may be separated. It is collected in the upper portion of the container and may be exhausted by the automatic air exhaust valve preferably controlled by a float.

Figure 1:
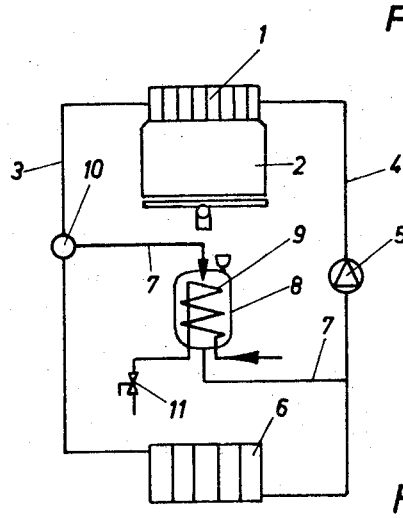

One illustrative embodiment of the present invention will be hereinafter described more fully with reference to the accompanying drawings, in which:

FIG. 1 is a diagram of the circulation heating system;
FIG. 2 is a longitudinal section through the domestic water heater; and
FIG. 3 illustrates a section through the air-exhaust valve on an enlarged scale.

The heat exchanger 1 of a gas-heated instantaneous water heater 2 has connected thereto a supply line 3 and a return flow line 4 into which a water circulating pump 5 is incorporated. Between supply and return flow lines 3, 4 one or more radiators 6 closing the heating circuit are interposed. Into a connection line 7 in parallel relationship to the radiators 6 and connecting the supply line 3 to the return flow line 4, a domestic water heat exchanger 8 to be described hereinafter is incorporated. Heat exchanger 8 has a coil of pipe 9 through which the domestic water flows. The connection line 7 is connected to the supply line 3 through a priority switch valve 10 which is opened in well known manner, and not illustrated herein, when domestic water is drawn at a tap valve 11 of the coil of pipe 9. The priority switch valve 10 is such that it also releases a flow through the connection line 7 when the temperature of the circulating water flowing in the supply line 3 has not yet reached a predetermined operating temperature. Therefore, during the initial heating-up period the circulating water fed by the circulating pump 5 is directly returned into the return flow line 4 through the connection line 7 and the domestic water heat exchanger 8, without transmitting heat to the radiators 6. Thereby, a rapid heating of the circulating water to operating temperature is effected. After the predetermined operating temperature reached, the priority switch valve 10 shuts off the connection line 7 resulting in the hot circulating water now flowing through the radiators 6 of the heating circuit. During heating operation the connection line 7 will be opened again only if and as long as domestic water is drawn. With the mode of operation as described it is possible to adapt the container of the domestic water heater 8 as an air separator.

The container 12 of the domestic water heater 8 illustrated in FIG. 2 has an inlet socket connecter 13 and an oppositely disposed outlet socket connecter 13' both of which are connected to the connection line 7. Guide means are defined by a downwardly open piece of pipe 14 terminates close above the bottom 15' of a cup-shaped insert 15 surrounding the piece of pipe 14. Pipe 14 communicates the inlet socket connecter 13. Between the piece of pipe 14 and the insert piece 15 on the one hand, and the insert piece 15 and the container 12 on the other hand, annular spaces 16, 17 are provided through which the circulating water entering through the inlet socket connecter 13 must flow under multiple reversal of the direction of flow before being allowed to flow out of the container 12 through the outlet socket connecter 13'. The coil of pipe 9 is accommodated in the annular spaces 16, 17 so that a heat exchange can take place between the circulating water and the coil of pipe 9 and the domestic water can be heated in the coil of pipe 9. The coil of pipe 9 engages the walls 14, 15, 12 only at axially extending stamped-out ribs 18 so that the heating water may flow around the individual turns of the coil of pipe 9 from all sides. At least the portions of the annular spaces 16, 17 which are not occupied by coils 9 are substantially larger in cross section (as measured transverse to the flow of water in the spaces) than is the cross section of line 7. Thus, the rate of flow of water through these portions will be substantially less than the rate of flow in line 7.

Figure 3:
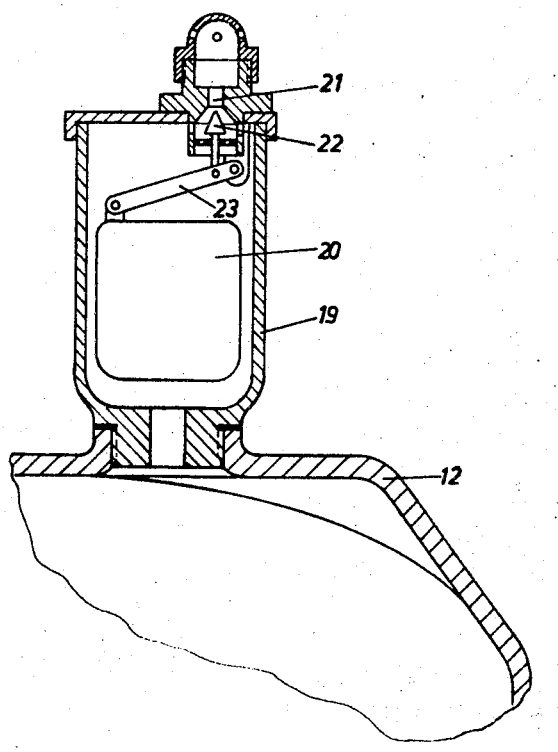

When the heating water is flowing through the container 12, due to the multiple reversal of the direction of flow and the reduction in the rate of flow, air will be separated collecting in the upper portion of the container 12, where an automatic air exhaust valve 19 is arranged, which valve is separately illustrated in FIG. 3. It includes a float 20 automatically controlling a valve closing body 22 closing the exhaust opening 21, through a lever system 23. Thus, no heating water is allowed to discharge through the exhaust opening 21, whereas the collecting air may escape unhindered.

We claim:

1. In a hot water heating system comprising a gas heated water heater, a radiator, a supply line and a return line each connecting the heater and the radiator, a thermostatically controlled priority switch valve device in one of said lines, a connection line from said valve to the other line connected as a shunt across the radiator, a domestic water conduit, and a heat exchanger communicating with said conduit and having an inlet and an outlet and communicating with said connection line for transferring heat from the water in said connection line to the water in said domestic water conduit, said valve device directing the flow of water through said connecting line both during the period that said water heater is initially heating up the water and during the period when domestic water is being drawn through the domestic water conduit, the improvement wherein:

said heat exchanger comprising container means communicating with the connection line for separating entrained air from the water flowing through said connection line, and guide means in said container means for causing the water to flow along a deflected path through a greater distance than the straight distance from inlet to outlet and at a reduced speed; and said system includes an automatic air exhaust valve communicating with the upper portion of said container means.

2. In a system as set forth in claim 1, wherein said guide means comprises insert means therein dividing said container means into concentric annular channels through which the water from the connection lines flows first in one direction and then in the opposite direction with respect to the container means.

3. In a system as set forth in claim 2, wherein portions of said channels have a cross-sectional area, transverse to the path of flow of water therethrough, larger than the cross-sectional area of said connection line whereby the rate of flow of water through said portions is less than the rate of flow of water in said connection line.